(12) United States Patent
Nomoto et al.

(10) Patent No.: US 7,444,294 B2
(45) Date of Patent: Oct. 28, 2008

(54) METHOD OF PRODUCTION PLANNING

(75) Inventors: Tazu Nomoto, Yokohama (JP); Sachiko Iwamoto, Yokohama (JP); Mitsuhiro Enomoto, Fujisawa (JP); Katsunari Ikezawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 09/738,325

(22) Filed: Dec. 18, 2000

(65) Prior Publication Data

US 2001/0004520 A1    Jun. 21, 2001

(30) Foreign Application Priority Data

Dec. 16, 1999   (JP)   ................... 11-356967
Oct. 27, 2000   (JP)   ................... 2000-333532

(51) Int. Cl.
  *G06F 17/50*   (2006.01)
(52) U.S. Cl. .......................................................... 705/7
(58) Field of Classification Search ..................... 705/7
  See application file for complete search history.

(56) References Cited

U.S. PATENT DOCUMENTS 5,787,283 A * 7/1998 Chin et al. ................ 717/101
5,946,662 A * 8/1999 Ettl et al. ...................... 705/8
5,970,465 A * 10/1999 Dietrich et al. ............... 705/7
6,138,103 A * 10/2000 Cheng et al. .................. 705/7
6,341,266 B1 * 1/2002 Braun .......................... 705/7

OTHER PUBLICATIONS

Thierauf et al., Decision Making Through Operations Research, Second Edition, John Wiley & Sons, 1975, chapter 6.*
Greene, James H., Production and Inventory Control Handbook, McGraw-Hill, 1997.*

* cited by examiner

*Primary Examiner*—Jeffrey A. Smith
*Assistant Examiner*—Kalyan Deshpande
(74) *Attorney, Agent, or Firm*—Mattingly, Stanger, Malur & Brundidge, P.C.

(57) ABSTRACT

For planning a production plan which satisfies a plural number of target values of management indices, upon calculating out production amount, supply amount and/or transportation means of plural products, various kinds of target values of management indices and estrangement values thereof are set into restriction conditions when those restriction conditions are formulated into a linear programming problem, and then feasible production plan is calculated out, so that the estrangement between the management indices being calculated from executable solutions of the above-mentioned linear programming problems and the target values thereof comes to be minimal.

5 Claims, 10 Drawing Sheets

FIG. 6

| ITEM | TRANSPORT FROM | TRANSPORT TO | TRANSPORT MEANS | TRANSPORT LEAD TIME | TRANSPORT COST |
|---|---|---|---|---|---|
| PC | P1 | M1 | CAR | 1 | 6 |
| | P1 | M2 | AIRPLANE | 2 | 10 |
| | P1 | M2 | SHIP | 3 | 8 |
| | P1 | M3 | AIRPLANE | 2 | 10 |
| | P1 | M3 | SHIP | 3 | 7 |
| | P2 | M1 | AIRPLANE | 2 | 9 |
| | P2 | M1 | SHIP | 3 | 7 |
| | P2 | M2 | AIRPLANE | 2 | 9 |
| | P2 | M2 | SHIP | 3 | 8 |
| | P2 | M3 | CAR | 1 | 4 |
| HDD | P3 | P1 | CAR | 1 | 1 |
| | P3 | P2 | CAR | 1 | 1 |
| CPU | V1 | P1 | CAR | 1 | 1 |
| | V1 | P2 | CAR | 1 | 1 |
| DISK | V1 | P3 | CAR | 1 | 1 |

FIG. 7

| ITEM | PRODUCTION POINT | OPERATION TIME | LEAD TIME | PRODUCTION COST | STANDARD COST |
|---|---|---|---|---|---|
| PC | P1 | 1 | 1 | 3 | 7 |
| PC | P2 | 1 | 2 | 1 | 5 |
| HDD | P3 | 1 | 1 | 1 | 3 |

FIG. 8

| ITEM | SUPPLY POINT | OPERATION TIME | LEAD TIME | UNIT COST | STANDARD COST |
|---|---|---|---|---|---|
| CPU | V1 | 1 | 1 | 5 | 1 |
| DISK | V1 | 1 | 1 | 3 | 1 |

FIG. 9

| ITEM | PRODUCTION POINT | PRODUCTION AMOUNT | MARKETING POINT | TRANSPORT MEANS | TRANSPORT AMOUNT |
|---|---|---|---|---|---|
| PC | P1 | 160 | M1 | CAR | 70 |
| | P1 | | M2 | AIRPLANE | 60 |
| | P1 | | M2 | SHIP | 0 |
| | P1 | | M3 | AIRPLANE | 10 |
| | P1 | | M3 | SHIP | 20 |
| | P2 | 140 | M1 | AIRPLANE | 0 |
| | P2 | | M1 | SHIP | 30 |
| | P2 | | M2 | AIRPLANE | 0 |
| | P2 | | M2 | SHIP | 40 |
| | P2 | | M3 | CAR | 70 |

FIG. 10

| ITEM | PRODUCTION POINT | PRODUCTION AMOUNT | MARKETING POINT | TRANSPORT MEANS | TRANSPORT AMOUNT |
|---|---|---|---|---|---|
| PC | P1 | 90 | M1 | CAR | 60 |
| | P1 | | M2 | AIRPLANE | 0 |
| | P1 | | M2 | SHIP | 0 |
| | P1 | | M3 | AIRPLANE | 0 |
| | P1 | | M3 | SHIP | 30 |
| | P2 | 210 | M1 | AIRPLANE | 0 |
| | P2 | | M1 | SHIP | 40 |
| | P2 | | M2 | AIRPLANE | 70 |
| | P2 | | M2 | SHIP | 30 |
| | P2 | | M3 | CAR | 70 |

FIG. 11

| | |
|---|---|
| FULFILLMENT OF DEMAND M1 | 100% |
| FULFILLMENT OF DEMAND M2 | 100% |
| FULFILLMENT OF DEMAND M3 | 100% |
| RATE OF OPERATION OF P1 | 43% |
| RATE OF OPERATION OF P2 | 100% |
| RATE OF OPERATION OF P3 | 11% |
| EFFICIENCY OF PRODUCING CASH | 1.86 |
| SALES OF M1 | 4500 |
| SALES OF M2 | 3500 |
| SALES OF M3 | 3000 |
| CASH OBTAINED BY PRODUCTION ACTIVITY | 3120 |
| PROFIT | 3110 |
| COST | 7880 |
| STOCK | 1678 |

FIG. 12

| ITEM | PRODUCTION POINT | PRODUCTION AMOUNT | MARKETING POINT | TRANSPORT MEANS | TRANSPORT AMOUNT |
|---|---|---|---|---|---|
| PC | P1 | 147 | M1 | CAR | 70 |
|  | P1 |  | M2 | AIRPLANE | 47 |
|  | P1 |  | M2 | SHIP | 0 |
|  | P1 |  | M3 | AIRPLANE | 23 |
|  | P1 |  | M3 | SHIP | 7 |
|  | P2 | 153 | M1 | AIRPLANE | 17 |
|  | P2 |  | M1 | SHIP | 13 |
|  | P2 |  | M2 | AIRPLANE | 53 |
|  | P2 |  | M2 | SHIP | 0 |
|  | P2 |  | M3 | CAR | 70 |

FIG. 13

| | |
|---|---|
| FULFILLMENT OF DEMAND M1 | 100% |
| FULFILLMENT OF DEMAND M2 | 100% |
| FULFILLMENT OF DEMAND M3 | 100% |
| RATE OF OPERATION OF P1 | 70% |
| RATE OF OPERATION OF P2 | 73% |
| RATE OF OPERATION OF P3 | 11% |
| EFFICIENCY OF PRODUCING CASH | 1.78 |
| SALES OF M1 | 4500 |
| SALES OF M2 | 3500 |
| SALES OF M3 | 3000 |
| CASH OBTAINED BY PRODUCTION ACTIVITY | 2836 |
| PROFIT | 2826 |
| COST | 8164 |
| STOCK | 1595 |

| | | |
|---|---|---|
| FULFILLMENT OF DEMAND M1 | | 100% |
| FULFILLMENT OF DEMAND M2 | | 100% |
| FULFILLMENT OF DEMAND M3 | | 100% |
| RATE OF OPERATION OF P1 | | 43% |
| RATE OF OPERATION OF P2 | | 100% |
| RATE OF OPERATION OF P3 | | 11% |
| EFFICIENCY OF PRODUCING CASH | | 1.86 |
| SALES OF M1 | | 4500 |
| SALES OF M2 | | 3500 |
| SALES OF M3 | | 3000 |
| CASH OBTAINED BY PRODUCTION ACTIVITY | | 3120 |
| PROFIT | | 3110 |
| COST | | 7880 |
| STOCK | | 1678 |

METHOD OF PRODUCTION PLANNING

FIELD OF THE INVENTION

The present invention relates to a method for production planning using a linear programming method. The production plan in this specification indicates or means a plan, relating to production activity, from supply of materials until transportation to a production point (or a base) and/or to a marketing point.

BACKGROUND OF THE INVENTION

In the manufacturing industry, upon the basis of sales planning from the marketing points, there are planned a supply amount of materials and/or a production amount, as well as transportation means, being feasible under the restriction conditions upon the production capability and the term and amount of supply of materials. In recent years, the supply point of materials, the production point, the marketing point have been expanded not only domestically, but also abroad, and it is possible to select a plural number of the supply points, production points, and the marketing points, with regard to one kind or sort of the products. For example, regarding a product A, there may be a method, in which the materials are supplied from Asia so as to be fabricated in Japan, and another way in which they are supplied by Japan so as to be fabricated in the U.S.A., etc.

Several methods are proposed, in each of which the production plan forming the production mode is made up using a linear programming method. For example, in NIKKEI DIGITAL ENGINEERING (December of 1998), there is introduced a planning method for production plan, in which, under the restriction conditions of production capability and/or amounts of parts supply, while making a production time, a setup time, the maximum past due, and the maximum total past due as objective functions, the management indices, such as, the sales profit maximum, the average inventory minimum, observance of due date, effective operation, etc., are made minimal, respectively. Grade or rank of the each object is set in the priority, by giving weights thereon.

In case of using the management indices as objective functions, it is difficult to bring plural numbers of the management indices to the "minimum (or maximum)", at the same time. For example, when setting the management index, "total past due" according to the conventional art at the minimum, due to the mechanism of the linear programming, the production plans are made up in an order of swiftness in their delivery times, regardless of the kinds thereof, therefore the setup time does not necessarily come to be a minimum. This is because those management indices have a relationship of so-called trade-off (negative correlation) between them. For the indices being in such the relationship as the trade-off, it is sufficient that both those values come to be values being desirable for a person in charge of planning the production plan, i.e., a person who can decides one's mind, but not be minimized (maximized) at the same time. The desirable value is a numeral value which can be given in advance, i.e., the "value" at which the target is set by the person in charge of planning the production plan, such as, "it is desired that the inventory should be at ¥100,000" or the like, or is a ranges in values, such as "it is desired that the inventory should be less than ¥200,000". According to the conventional art, since parameters being changeable for approaching the management indices to those target values (or within the ranges) are only weights, therefore, for the purpose of approaching them to the target values, it is necessary to know the numeral values, at which the weights are to be set, by experiences. For the purpose of knowing them by experiences, it is necessary to solve a problem of the linear programming while adjusting the weights, as well as to repeat the operation of confirming the values of those management indices, therefore it sometimes necessitates times so as to make up the production plan.

When it is delayed in the planning of the production plan, the timings for starting the supply of materials, for preparation of production, and also for supplying the products onto the marketing points are delayed or postponed, it is impossible to deliver the products to the customers earlier than competitors.

SUMMARY OF THE INVENTION

An object of the present invention is, for solving such problems as mentioned above, to provide a method of production planning, wherein the values or ranges to be achieved at the lowest are taken into the consideration, for each of the management indices, when formulating the restriction conditions into the linear programming problem.

Another object of the present invention is to provide a method of production planning, wherein, in relation to the management indices for evaluation of the production plan, the condition of restriction is produced by means of a combination of at least one of the above-mentioned management indices, and by adding cash which the production activity produces and/or an efficiency, at which the production activity produces the cash, other than inventory, profit, sales, cost, a rate of operation (or the working ratio), and a fulfilling rate on demands from the marketing points, etc.

For achieving the object mentioned above, according to the present invention, there is provided a method of production planning, comprising steps of: putting a relationship between a target value of a predetermined management index and an estrangement value therefrom into restriction condition, when formulating the restriction condition into a linear programming problem; and calculating out a feasible production plan, so that the estrangement between the predetermined management index and the target value thereof, being calculated from an executable solution of the linear programming problem, comes to be minimal.

Also, for achieving the object mentioned above, in the method of production planning, as is defined in the above, wherein the management index is a combination of at least one or more of inventory, profit, sales, cost, a rate of operation, a fulfilling rate on demands from marketing point, cash which production activity produces, and an efficiency at which the production activity produces the cash.

Also, for achieving the object mentioned above, in the method of production planning, as is defined above, wherein the target value of the management index is set to be equal to, greater than or less than, or a maximal or minimal, with respect to a designated numerical value.

Also, for achieving the object mentioned above, in the method of production planning, as is defined in above, wherein the production amount and/or the supply amount and/or the transport means is/are calculated out by repeating steps of: setting the target value of the management index through an input means, solving the linear programming problem in a calculation means, displaying a result thereof on a display means, and again, changing the restriction condition stored in memory means upon receipt of change in the target value of the management index through the input means, solving the linear programming problem, the restriction condition of which is changed, in the calculation means, and displaying the result thereof on the display means.

Also, for achieving the object mentioned above, by means of a memory medium storing programs which when executed implements the method of production planning of the present invention, it is possible to provide the medium to a computer to implement etc.

BRIEF DESCRIPTION OF THE DRAWINGS

FIG. 6 is a view of showing information relating to transport route and transport means, in the example of the planning of the production plan;

FIG. 7 is a view of showing information relating to a production point, in the example of the planning of the production plan;

FIG. 8 is a view of showing information relating to a supply point, in the example of the planning of the production plan;

FIG. 9 is a view of showing a part of the production plan, which is planned in an exercise 1;

FIG. 10 is a view of showing a part of the production plan, which is planned at a first ($1^{st}$) time in an exercise 2;

FIG. 11 is a view of showing management indices of the production plan, which is planned at the first (1st) time in the exercise 2;

FIG. 12 is a view of showing a part of the production plan, which is planned at a second ($2^{nd}$) time in the exercise 2;

FIG. 13 is a view of showing the management indices of the production plan, which are planned at the second time in the exercise 2;

DETAILED DESCRIPTION OF PREFERRED EMBODIMENTS

In a method of production plan according to the present invention, upon basis of sales plan or schedule from a s(s), target values on management tactics, such as, storage, profit, sales, cost, the rate of operation, the fulfillment rate on amount of demands from the marketing points, cash which the production activity creates or produces, an efficiency, at which the production activity creates or produces the cash, etc., are set to be the restriction conditions, in addition to production capability at each of the points or transportation capability between the points, and the restriction on parts. And, they are formulated into a linear programming problem(s) by setting them into objective functions, so that the estrangement or discrepancies from the above-mentioned target values are minimized.

The method of production plan according to the present invention will be explained, by taking a production activity of fabricating or assembling semi-products from plural parts, and a activity of assembling or fabricating products from the plural semi-products and/or parts, as examples.

Figure 1:
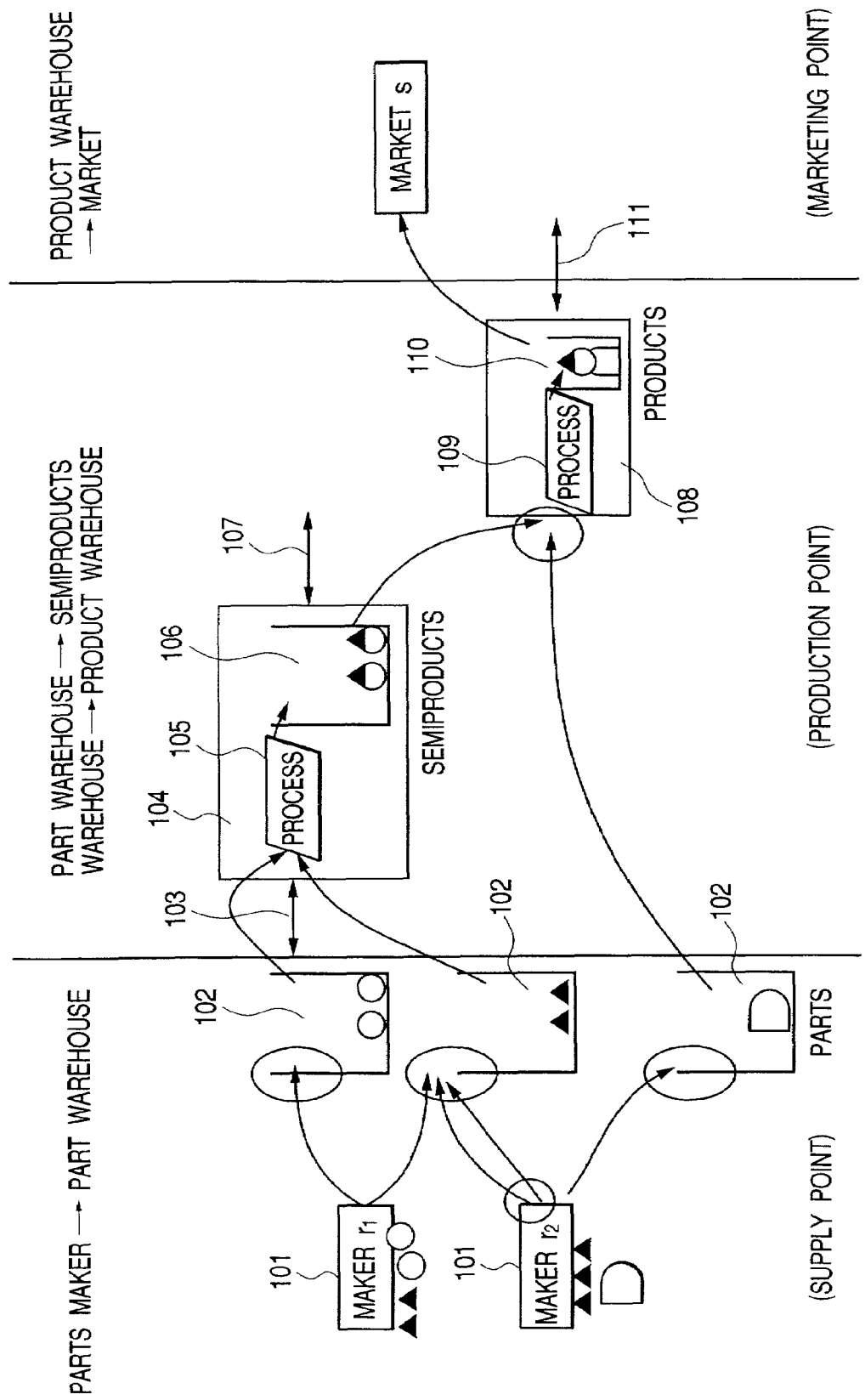
FIG. 1 is a view of showing flows of storage into a warehouse and delivery therefrom.

First, in determining the restriction upon parts and/or the restriction upon production capability, by paying attention onto the storage of the parts, the semi-products and/or the products, those are considered to be in warehouse (s), and flows of storage into the warehouse and of delivery from it are made into models, in each of the terms, without discrimination among those parts, semi-products and/or products. The flows of storage into the warehouse and of delivery from it are shown in FIG. 1. Orders for the parts are given to parts manufacturers (supply points) 101, and they are supplied after a delivery lead time, thereby being stored into the warehouses 102 as inventory of the parts. The warehouses 102 for the parts are considered to be located at parts supply points, for simplicity thereof in the models, however, in practice, it does not matter that they are located anywhere. The semi-products are manufactured, by delivering the necessary parts from warehouse 102 of the parts to a production point 104 in need thereof, after a transportation lead time 103, respectively, in a process 105 of the point and they are stored into the warehouse 106, thereby becoming inventory of semi-products. The products are manufactured, by delivering necessary parts and/or the semi-products from the respective warehouses 102 and 106 thereof to a production point 108 in need thereof, after a transportation lead time 107, in a process 109 of the point, and they are stored into the warehouse 110, thereby becoming inventory of products. The inventory of products is delivered by taking the transport lead time 111 into the consideration, so as to be within the due date to the marketing points.

Paying attention onto the storage and delivery into/from the warehouse, all of the parts, the semi-products and the products take flows, such as, storage into the warehouse→the warehouse→delivery from the warehouse, and the quantities of respective ones are depending upon one another, in the name of the same item. Also, the quantity of delivery for each item can be determined uniquely, by the quantity of storage of the item in need thereof, and the quantity of storage into each point for every term can be determined, in particular that of the semi-products and/or the products can be determined, by an amount of production in the process of the production point, while that of the parts can be determined by released order from the parts manufacturers (i.e., an estimated amount of the storage into the warehouse(s)).

Namely, the processes from the supply of parts until the delivery to the marketing points can be formulated into a linear programming problem, by combining those processes, i.e., the storage→the warehouse→the delivery of the each item.

First of all, assuming that:

T: the term of a target for planning (term);
N: the kinds or sorts of the products;
M: the kinds or sorts of the semi-products;
B: the kinds or sorts of the parts;
R: the number of the supply points (=the number of the parts manufacturers);
P: the number of the production points (=the number of the processes);
S: the number of the marketing points; and
E: the number of the transportation means, where appendices are set to be indicated by the follow equation:

(Eq. 1): Appendices t: the term at random (t=1, 2, . . . , T);

i: the items (N pieces of the products, M pieces of intermediate parts, and B pieces of the parts) (i=1, 2, . . . , N+M+B)

r: the parts manufacturer at random (r=p=1, 2, . . . , R);

p,p': the processes of the production points at random (p(=p')=R+1, R+2, . . . , R+P+S);

s: the marketing points at random (s=p=R+P+1, R+P+2, . . . , R+P+S); and e: the transport means (e=1, 2, . . . , E)

The following constants can be listed up, to be necessary when planning the production plans for the $1^{st}$ term to $T^{th}$ term:

(Eq. 2): Constants $I_{i0}^P$: the amount of inventory in the process p of the item i at the end of $0^{th}$ term (at the head of $1^{st}$ term)

(i=1, 2, . . . , N+M+B) (p=R+1, R+2, . . . , R+P));

$LT_i^P$: the lead time of the item i, from casting into process up to storage into the warehouse in the process p, (i=1, 2, . . . , N+M+B) (p=R+1, R+2, . . . , R+P));

$LT_{ie}^{pp'}$: the transport lead time of the item i, from the process p to the process p', via the means e, (i=1, 2, . . . , N+M+B) (e=1, . . . , E) (p=1, 2, . . . , R+P,p'=R+1, R+2, . . . , R+P+S);

$BM_{ij}$: required amount of the items j being necessary for producing the item i, by one unit, (i=1, 2, . . . , N+M) (j=N+1, N+2, . . . , N+M+B)

$BMS_{ij}$: required amount of the items j being necessary for producing the item i, by one unit (1 layer), (i=1, 2, . . . , N) (j=N+M+1, N+M+2, . . . , N+M+B);

$W_{it}^{pp'}$: the amount of the released orders and/or work in process of the item i, into the warehouse from the process p to the process p', (i=1, 2, . . . , N+M+B) (p=R+1, R+2, . . . , R+P) (t=1, 2, . . . , T)

$WF_i^{pp'}$: the estimated amount of the released orders and/or work in process of the item i, into the warehouse from the process p to the process p', after $T+1^{th}$ term, (i=N+M+1, 2, . . . , N+M+B) (p=R+1, R+2, . . . , R+P);

$C_t^P$: operable time at the process p in the $t^{th}$ term, (p=R+1, R+2, . . . , R+P) (t=1, 2, . . . , T);

$K_i^P$: operable time at the process p for the item i, (i=1, 2, . . . , N+M+B) (p=R+1, R+2, . . . , R+P);

$D_{it}^s$: estimated amount of sales of the item i in the $t^{th}$ term from the marketing points s, (s(=p)=R+P+1, R+P+2, . . . , R+P+S) (i=1, 2, . . . , N) (t=1, 2, . . . , T);

$PR_i^s$: selling price of the item i to s, (s(=p)=R+P+1, R+P+2, . . . , R+P+S) (i=1, 2, . . . , N);

$PM_i^P$: standard cost, (p=R+1, R+2, . . . , R+P);

$PP_i^r$: unit price when supplying the item i at the parts manufacturer r, (i=N+M+1, . . . , N+M+B) (r(=p)=1, 2, . . . , R);

$PP_i^P$: production cost of the item i at the process p, (i=1, 2, . . . , N+M+B) (p=R+1, R+2, . . . , R+P);

$PO^P$: over time cost at the process p, (p=R+1, R+2, . . . , R+P)

$IR_i^s$: a rate of interest for the $t^{th}$ term on the item on the process p, (p=1, . . . , R+P) (i=1, 2, . . . , N+M+B) (t=1, 2, . . . , T);

$Q_{ie}^{pp'}$: unit transport cost of the item i from the process p up to p' via the transport means e, (i=1, 2, . . . , N+M+B) (e=1, . . . , E) (p=1, 2, . . . , R+P, p'=R+1, R+2, . . . , R+P+S)

$DC_{et}^{pp'}$: capable capacity of transportation in the $t^{th}$ term from the process p to p' via the transport means e, (e=1, . . . , E) (p=1, 2, . . . , R+P, p'=R+1, R+2, . . . , R+P+S)

$V_i$: transport capacity per a unit of the item i, (i=1, 2, . . . , N+M+B);

FC: fixed cost; and $BMM_{ij}$: required amount of the parts j being necessary for producing a half product i by one unit (1 layer)

The variables are set as follows:

(Eq. 3): Variables $I_{it}^P$: amount of inventory of the item i at the end of the $t^{th}$ term at the process p, (i=1, 2, . . . , N+M+B), (t=1, 2, . . . , T) (p=r+1, 2, . . . , R+P);

$R_{it}^P$: amount of storage into the warehouse of the item i at the process p in the $t^{th}$ term (except for the released orders and the work in process), (i=1, 2, . . . , N+M+B), (t=1, 2, . . . , T), (p=r+1, 2, . . . , R+P), however, $R_{it}^P \geq 0$;

$U_{iet}^{pp'}$: amount of delivery of the item i from the warehouse, from the process p to p' via the means e in the $t^{th}$ term, (i=N+1, N+2, . . . , N+M+B), (t=1, 2, . . . , T), (p=1, 2, . . . , R+P+S), however, $U_{iet}^{pp'} \geq 0$;

$X_{it}^s$: distribution amount of the item i to the marketing points s in the $t^{th}$ term, (s=(p=)R+P+1, R+P+2, . . . , R+P+S) (i=1, 2, . . . , N) (t=1, 2, . . . , T) however, $X_{it}^s \geq 0$; and $CO_t^P$: over time at the process p in the $t^{th}$ term However, the amount R of storage into the warehouse in relation with the parts indicates the supply amount of the parts which will be generated newly (except for the released orders), while the amount R of storage into the warehouse in relation with the semi-products and/or the products indicates the production amount at each of the production points which will be generated newly (except for the amount of the work in process).

<Restriction Condition 1>

Since the inventory of the item i at the point p in the $t^{th}$ term is at an amount, which can be obtained by subtracting the delivery in the $t^{th}$ term from the amount obtained by adding the storage in the $t-1^{th}$ term and the expectation of the storage in the $t-1^{th}$ term to the inventory in the $t-1^{th}$ term (the released orders or the work in process), it comes to be as follows:

(Eq. 4): Restriction Condition 1

$$I_{it}^p = I_{it-1}^p + R_{it}^p + \sum_{p''=1}^{R+P} W_{it}^{p''p} - \sum_{e=1}^{E} \sum_{p'=1}^{p+S} U_{iet}^{pp'}$$

$(i = 1, 2, \ldots, N + M + B)$ $(p(= p') = R + 1, R + 2, \ldots, R + P)$ $(t = 1, 2, \ldots, T), (e = 1, 2, \ldots, E)$ (i=1, 2, . . . , N+M+B) (p(=p')=R+1, R+2, . . . , R+P)

(t=1, 2, . . . , T), (e=1, 2, . . . , E)

This is common for the products, the semi-products, and the parts thereof.

<Restriction Condition 2>

The amount of the delivery of the item j in the $t^{th}$ term comes to "the expectation of storage×the required amount of the item j" of the item i following thereto (the item being produced by making the j as the parts thereof). However, since the item j is the semi-products or the parts, and since the item i is the parts or the semi-products, therefore the following relationship is established:

(Eq. 5): Restriction Condition 2

$$\sum_{\substack{p \\ t-LT_{ie}^{pp'} \geq 1}} \sum_{e} U_{je,t-LT_{ie}^{pp'}}^{pp'} = \sum_{\substack{i=1 \\ t+LT_i^p \leq T}}^{N+M} BM_{ij} \cdot R_{i(t+LT_i^{p'})}^{p'}$$

$(j = N+1, \ldots, N+M+B)$ $(p(=p') = R+1, R+2, \ldots, R+P)$
$(t = 1, 2, \ldots, T)$ $(e = 1, 2, \ldots, E)$ (j=N+1, ..., N+M+B) (p(=p')=R+1, R+2, ..., R+P)
(t=1, 2, ..., T) (e=1, 2, ..., E)

<Restriction Condition 3>

The storage amounts of the products and the semi-products i and the expectation amounts thereof are restricted by the operable time at the process for the production thereof. Namely, since the products and the semi-products i which will be produced at the process p in the $t^{th}$ term cannot be produced beyond the operable time which the process p has in the $t^{th}$ term, the storage amount of i comes to be as follows:

(Eq. 6): Restriction Condition 3

$$\sum_{i=1}^{N+M} \left\{ K_i^p \cdot \left( R_{it}^p + \sum_{p'=R+1}^{R+P} W_{it}^{pp'} \right) \right\} \leq C_t^p$$

$(p = R+1, \ldots, P), (i = N+1, \ldots, N+M+B)$
$(t = 1, 2, \ldots, T) (e = 1, 2, \ldots, E)$ (p=R+1, ..., P), (i=N+1, ..., N+M+B) (t=1, 2, ..., T) (e=1, 2, ..., E)

In case of taking the over times into the consideration, it may be replaced by the following:

(Eq. 7): Restriction Condition 4

$$\sum_{i=1}^{N+M} \left\{ K_i^p \cdot \left( R_{it}^p + \sum_{p'=R+1}^{R+P} W_{it}^{pp'} \right) \right\} \leq C_t^p + CO_t^p$$

$(p = R+1, \ldots, P), (i = N+1, \ldots N+M+B)$
$(t = 1, 2, \ldots, T) (e = 1, 2, \ldots, E)$ (p=R+1, ..., P), (i=N+1, ... N+M+B) (t=1, 2, ..., T) (e=1, 2, ..., E)

In case where there is an upper limit for the over time, the following restriction condition is added by setting the upper limit of over time at the process p in the $t^{th}$ term (a constant) to be Opt≦OMAX(p,t):

(Eq. 8): Restriction Condition 5
Opt≦OMAX(p,t), (p=R+1, ..., R+P) (t=1, ..., T) (p=R+1, ..., P), (i=N+1, ... N+M+B) (t=1, 2, ..., T)

<Restriction Condition 4>

For the storage of the item i in the $t^{th}$ term, the delivery of the parts which will be used for the item (or the order in case of the parts) is generated before the transport lead time+the lead time until the storage after the production thereof (or supply lead time in case of the parts), however if it occurred in the past term, the production (or the order) is impossible, therefore the following is established:

(Eq. 9): Restriction Condition 4
RP=0
(i=1, ... N+M+B) (p(=p')=R+1, R+2, ..., R+P)
(t|t−$LT_i^P$≦0,t=1, ..., T∈B)
(i=1, ... N+M+B) (p(=p')=R+1, R+2, ..., R+P)
$R_{it}^P$=0
(i=1, ... N+M+B) (p(=p')=R+1, R+2, ..., R+P)
(t|t−$LT_i^P$≦0,t=1, ..., T∈B)<

<Restriction Condition 5>

Since the delivery of the products i is distributed to the marketing points, the following is established:

(Eq. 10): Restriction Condition 5

$$\sum_p \sum_e U_{ie(t-LT_{ie}^{ps})}^{ps} = x_{it}^s$$

$(s = R+P+1, R+P+2, \ldots, R+P+S) (p = R+1, R+2, \ldots, R+P)$
$(i = 1, 2, \ldots, N) (t = 1, 2, \ldots, T)$ (s=R+P+1, R+P+2, ..., R+P+S)(p=R+1, R+2, ..., R+P)
(i=1, 2, ..., N) (t=1, 2, ..., T)

<Restriction Condition 6>

Since the amount to be distributed to the marketing points does not go beyond the expectation amount of sales, the following is established:

(Eq. 11): Restriction Condition 6
$D_{it}^s \geq x_{it}^s$(i=1, ..., N),(s∈S),(t=1, ..., T) (i=1, ..., N), (s∈S) (t=1, ..., T)<

<Restriction Condition 7>

The amount of delivery of the item is restricted upon a transportable amount. Since the amount to be delivered from the process p to the process p' in the $t^{th}$ term through the transport means e does not go beyond the transport capability, the following is established:

(Eq. 12): Restriction Condition 7

$$\sum_{i=1}^{N+M+B} \left\{ V_i \cdot U_{iet}^{pp'} \right\} \leq DC_{et}^{pp'}$$

$(p = 1, \ldots, R+P) (p' = R+1, \ldots, R+P+S) (t = 1, 2, \ldots, T),$
$(e = 1, 2, \ldots, E)$ (p=1, ..., R+P) (p'=R+1, ..., R+P+S) (t=1, 2, ..., T), (e=1, 2, ..., E)

Next, the restriction conditions in relation with the target values of the management indices will be shown.

The management indices includes the inventory, profit, sales, cost, the rate of operation, the fulfillment rate with demand amount from the marketing points, cash which is produced by the production activity, and an efficiency at which the production activity produces the cash, and with respect to the respective indices, the target values thereof are combined into the restriction conditions as the constants. However, there sometimes occurs a possibility that the production plan satisfying the target values of the management indices do not exist, necessarily. In other words, there is the possibility that no region exists, which can be executed, in the linear programming problem. In such the case, if giving a calculation result thereof, such as "infeasible", it is impossible to know or acknowledge the reason why it comes to be so. Then, according to the present invention, an actual value is described by the following equation:

Actual value (variable)=target value+positive estrangement from the target value (variable)−negative estrangement from the target value (variable)

When setting the target value for the storage at 50, for example, it comes to be as follows:

Actual value=50+positive estrangement from the target value−negative estrangement from the target value In a case where, as a result of solving the linear programming problem, there exists no solution being executable for the target value 50 of the storage, then as the result thereof, the "actual value" is 40, upon the restriction condition, it comes to be 40=50+0−10, thereby satisfying the condition of "=". By formulating in such the manner, it becomes easy for a planner of the production plan to decide on the intention for a next action (such as, lowering the target values of the management indices in the relationship of trade-off, etc.).

The restriction condition of each of the management indices is shown in below.

<Restriction Condition 8: the Fulfillment Rate with Demand Amount from the Marketing Points>

Assuming that the fulfillment target value of the expectation amount of sales of the item i in the $n^{th}$ term from the marketing points s be GV1, then the following is established:

(Eq. 13): Restriction Condition 8

$$x_{it}^s = D_{it}^s + GV_1 + d_{1,s,i,t}^+ - d_{1,s,i,t}^-$$

$$(i = 1, \ldots, N,\ s = R + P + 1, \ldots, R + P + S,\ t = 1, 2, \ldots, T)$$

$d_{1,s,i,t}^+$: positive estrangement from the target value $d_{1,s,i,t}^-$: negative estrangement from the target value (i=1, ..., N, s=R+P+1, ..., R+P+S, t=1, 2, ..., T)
$d_{1,s,i,t}^+$: positive estrangement from the target value
$d_{1,s,i,t}^-$: negative estrangement from the target value
<Restriction Condition 9: the Rate of Operation>

Assuming that the target value for the rate of operation at the production point p be GVp2, the following is established:

(Eq. 14): Restriction Condition 9

$$\sum_{t}\sum_{i=1}^{N+M}\left\{K_i^p \cdot \left(R_{it}^p + \sum_{p'=R+1}^{R+P} W_{it}^{pp'}\right)\right\} = GV_2^p \cdot \sum_t C_t^p + d_{2,p}^+ - d_{2,p}^-$$

$$(p = R+1, \ldots, R+P)$$

$d_{2,p}^+$: positive estrangement from the target value $d_{2,p}^-$: negative estrangement from the target value (p=R+1, ..., R+P)
$d_{2,p}^+$: positive estrangement from the target value
$d_{2,p}^-$: negative estrangement from the target value
<Restriction Condition 10: the Efficiency of Producing Cash by Production Activity>

By means of the cash which is produced by the production activity during the period from the $1^{st}$ term to the $T'^{th}$ (<T) term of a planning term, the production plan is estimated.

Figure 2:
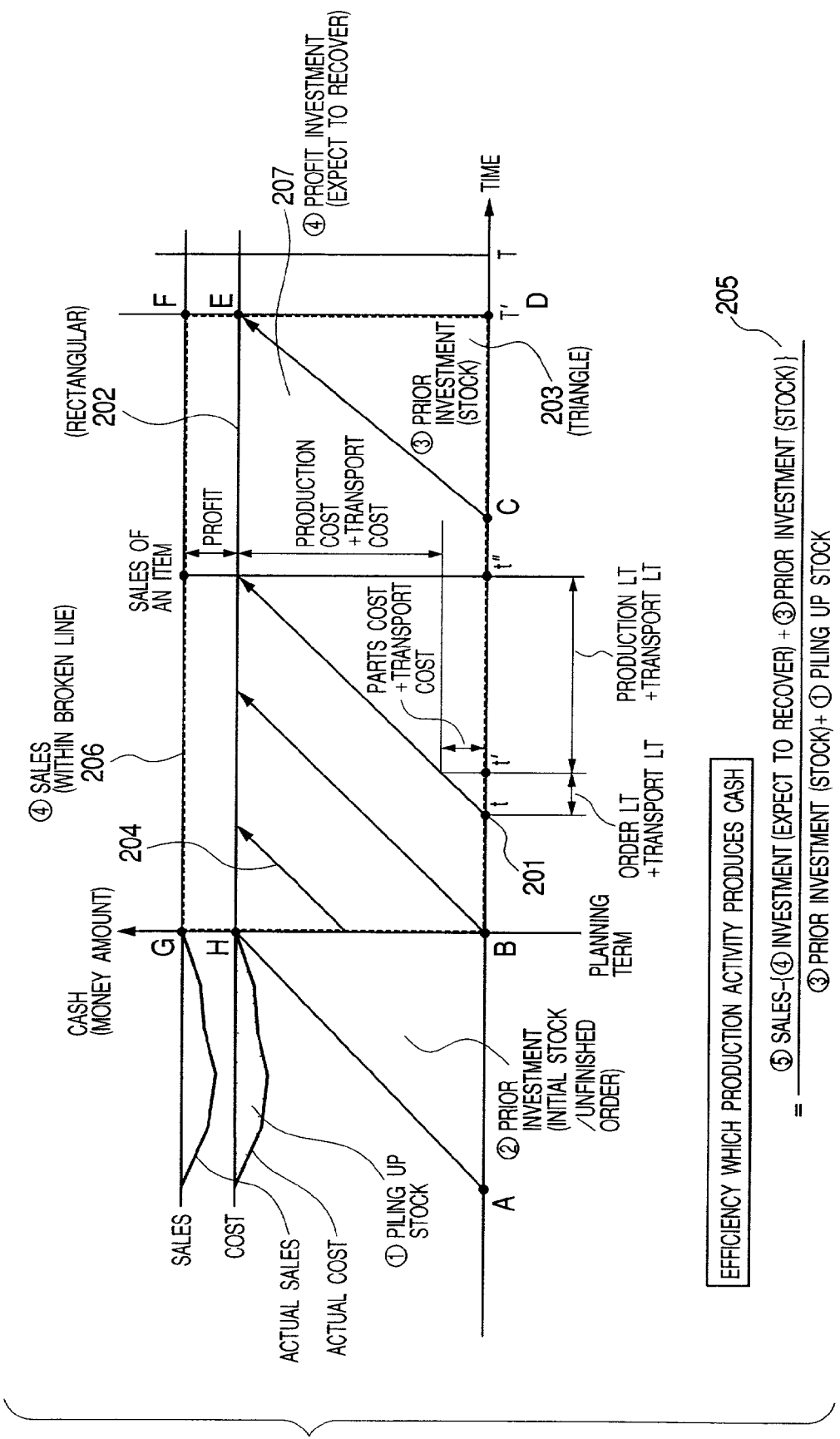
FIG. 2 is a view of showing a relationship between products and cash.

A relationship between the products and the cash is shown in FIG. 2. Taking the cash (money amount) on the vertical axis while the terms on the horizontal axis, the term intersecting with the vertical axis is a planning term (head of one term). An arrow 201 indicates process, in which one (1) piece of a certain product is produced, wherein no cash is invested for that product at the time point t when starting supply of the parts, however at the time point t' passing by the time of the order lead time+the transport lead time thereafter, the investment is made for the unit prices of the parts+the transport cost thereof. Following with continuity of the production, the investment is increased, and the cost (except for the fixed cost) in relation with that product is determined at the time point t" when being distributed to the marketing points as the product. Assuming that that product is sold at an instance when it reaches to the marketing point, so as to recover the cash therefor, the sales—the cost comes to be the cash which that product produces. This arrow is drown in a plural number during the period of the planning, therefore the cash which was invested from the planning term until the $T'^{th}$ (<T) term is coincident with an area of a rectangular BDEH 202 (restrictively speaking, it does not come to be the rectangular, since the cost for each of the products is not constant, but it is simplified for aid of understanding thereof) Within 202, there are the investment 207 (a rectangular BCEH) to be recovered until the $T'^{th}$ (<T) term and prior investment 203 (a triangle CDE) for the purpose of selling the product after the $T'^{th}$ term. The prior investment 203 will be recovered after the $T'^{th}$ term. On the contrary, for the products with the arrow 204, there is the cash which was invested as the prior investment before the planning term, and also there is one which can be recovered during the terms from the planning term to the $T'^{th}$ term.

In such the manner, the investment in the planning term can be divided into the investment relating to the products, from which the cash is recovered, and the prior investment for the next coming terms. It is the that the smaller on the investment, the better, and in particular, for the product being changeable in the demand thereof among them, the prior investment 203 for the next coming terms, which are high on a factor of uncertainty should be better as small as possible. Therefore, obtaining more cash with a small investment comes to be the management index for measuring the superiority of the production plan. The obtaining of more cash with the small investment is calculated according to the equation 205, as the efficiency at which the production activity produces the cash.

The numerator or fraction is the subtraction of the cash 202 (=207+203) invested during the terms from $1^{st}$ to $T'^{th}$ from the sales (206: though also the sales should not be at constant in the amount, but it is indicated by the rectangular BDFG for the simplification, in the same manner as 202), i.e., it indicates the cash (the rectangular HEFG) obtained from the production activity during the $1^{st}$ to $T'^{th}$ terms. The denominator is the addition of delaying inventory (being considered as the prior investment) to the prior investment 203. From this calculation, the cash per one unit of the prior investment can be calculated out. According to the present invention, this is defined as the efficiency of producing the cash by the production activity.

This calculation is that applying ROA (Return On Asset) into the production activity.

Formulating the above calculation, the numerator comes to be the cash which is obtained through the production activity during the terms 1st to $T'^{th}$, namely:

(Eq. 15): Cash obtained by production activity $$\sum_i \sum_s PR_i^s \cdot \sum_{t=1}^{T} x_{it}^s - \left\{\sum_{p=1}^{R+P} \sum_{p'=R+1}^{R+P+S} \sum_{i=1}^{N+M+B} \sum_{e=1}^{E} \sum_{t=1}^{T'} Q_{ie}^{pp'} \cdot U_{iet}^{pp'} + \sum_{p=1}^{R+P} \sum_{i=1}^{N+M+B} \left(PP_i^p \cdot \sum_{t=1}^{T'} R_{it}^p\right) + \sum_{p=R+1}^{R+P} \sum_{t=1}^{T'} PO^p \cdot CO_t^p\right\}$$

Where the denominator comes to be the prior investment (the inventory) at the time point of the $T'^{th}$ term, as indicated below:

(Eq. 16): Prior Investment (Inventory)

$$\sum_{j=1}^{B}\left\{\left(\frac{1}{R_j}\sum_{r\in R_j}PP_j^r\right)\cdot\left\{\begin{array}{l}\sum_{r\in R}\sum_{t=1}^{T'}R_{jt}^r+\sum_{r\in R}\left\{I_{j0}^p+\sum_{t=1}^{T}\sum_{r=R+1}^{R+P}W_{jt}^{rp}\right\}+\\ \sum_{i\in M}\{BMM_{ij}\cdot(I_{i0}+WIP_{it}^p+W_{it}^{pp'})\}-\\ \sum_{i=1}^{N}\left(BMS_{ij}\cdot\sum_{s}\sum_{t=1}^{T'}x_{it}^s\right)\end{array}\right\}\right\}+$$

$$\sum_{i=1}^{N+M}\sum_{p\in P}\left\{PP_i^p+\sum_{j=N+1}^{N+M+B}\left(BM_{ij}\cdot\frac{1}{P_b}\sum_{p'\in P_b}PM_j^{p'}\right)\right\}\cdot$$

$$\left\{I_{iT'}^p+\sum_{t=T'+1}^{T}\{R_{it}^p\,|\,t-LT_i^p\le T'\}\right\}+$$

$$\sum_{i=1}^{N+M+B}\sum_{\substack{p\in R+P\\p'\in P+S}}\left\{\{Q_{ie}^{pp'}\,|\,i\in n\}+PM_i^p\right\}\cdot\sum_{t=1}^{T'}\{U_{iet}^{pp'}\,|$$

$$t+LT_{ie}^{pp'}>T'\bigg\}$$

However, the first line of this equation is the product obtained from multiplying the number of the parts remaining at the each point by the unit price of part, wherein the products and/or the semi-products are converted to the parts. Since the unit prices of parts are different depending upon the supply points, an average value thereof is used. Rj is a set or assembly of the supply points which can supply the part j. The second line is the product obtained from multiplying the products and/or semi-products remaining at the production points by the sum of the production cost and a standard cost. The standard cost of the semi-products (parts) j at the process p' indicates an average value between the production cost thereof, which will be necessitated from manufacturing the semi-products (parts) j at the process p' until they are transported as the parts to an arbitrary process p of the production points, and the transport cost. The third line is the product obtained from multiplying the amount of products which are transported to each point by the standard cost of products (since the transport cost to the marketing points is not included in the standard cost of products, the transport cost is added thereto).

In case of formulating the efficiency of producing the cash by the production activity as the restriction condition, the average value of the prior investment, being calculated out for each of the terms, is used into the denominator, while setting the cash obtained by the production activity during the $1^{st}$ to $T^{th}$ terms into the numerator. This is because, if it is estimated only by the prior investment (the inventory) in the $T'^{th}$ term, there is a possibility that the prior investment comes to be large in the terms except for that of $T'^{th}$, and then it is impossible to obtain a desired production plan. Also, conducting the calculation by setting $T'=T^{th}$ term, the production plan cannot be made up produced because the sales schedule after the $T^{th}$ term is out of the target of the calculation, therefore the prior investment comes to be zero (0).

From the above, the restriction condition 10 upon the efficiency of producing the cash by the production activity comes to be as follows, assuming that the target value is GV3:

(Eq. 17): Restriction Condition 10

$$\sum_{s}\sum_{i=1}^{N}\sum_{t=1}^{T}PR_i^s\cdot x_{it}^s-\left(\begin{array}{l}\sum_{p=1}^{R+P}\sum_{p'=R+1}^{R+P+S}\sum_{i=1}^{N+M+B}\sum_{e=1}^{E}\sum_{t=1}^{T}Q_{ie}^{pp'}\cdot U_{iet}^{pp'}+\sum_{p=1}^{R+P}\sum_{i=1}^{N+M+B}\left(PP_i^p\cdot\sum_{t=1}^{T}R_{it}^p\right)+\\ \sum_{p=R+1}^{R+P}\sum_{t=1}^{T}PO^p\cdot CO_t^p\end{array}\right)=$$

$$GV_3\cdot\left|\frac{1}{T}\right|\left\{\begin{array}{l}\sum_{j=1}^{B}\left\{\left(\frac{1}{R_j}\sum_{r\in R_j}PP_j^r\right)\cdot\left\{\sum_{r\in R}\sum_{t=1}^{T}R_{jt}^r+\sum_{r\in R}\left\{I_{j0}^p+\sum_{t=1}^{T}\sum_{r=R+1}^{R+P}W_{jt}^{rp}\right\}\right\}\right\}+\\ \sum_{i=1}^{N=M}\sum_{p\in P}\left[\left\{PP_i^p+\sum\left(BM_{ij}\cdot\frac{1}{P_b}\sum_{p\in P_b}PM_j^{p'}\right)\right\}\cdot\\ \left\{\sum_{t=1}^{T}\{I_{it}^p+R_{it}^p\cdot LT_i^p\}\right\}\end{array}\right]+\\ \sum_{i=1}^{N+M+B}\sum_{\substack{p\in R+P\\p'\in P+S}}\{\{Q_{ie}^{pp'}\,|\,i\in n\}+PM_i^p\}\cdot\sum_{t=1}^{T}\{U_{iet}^{pp'}\cdot LT_{ie}^{pp'}\}\end{array}\right\}+d_3^+=d_3^-$$

$d_3^+$: positive estrangement from the target value $d_3^-$: negative estrangement from the target value <Restriction Condition 11: Sales>

Assuming that the sales target at the marketing point is GV4,s, the following is established:

(Eq. 18): Restriction Condition 11

$$\sum_{i=1}^{N}\sum_{t=1}^{T} PR_i^s \cdot x_{it}^s = GV_{4,s} + d_{4,s}^+ - d_{4,s}^-$$

$d_{4,s}^+$: positive estrangement from the target value $d_{4,s}^-$: negative estrangement from the target value <Restriction Condition 12: Cash Produced by the Production Activity>

The previous numerator of the efficiency of producing the cash by the production activity is set to be one of the management indices. This index is used when it is requested that the cash is obtained as much as possible, regardless of the prior investment. Assuming the target value be GV5, the equation comes to be as follows:

(Eq. 19): Restriction Condition 12

$$\sum_{s}\sum_{i=1}^{N}\sum_{t=1}^{T} PR_i^s \cdot x_{it}^s - \left\{ \begin{array}{c} \sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot \\ U_{iet}^{pp'} + \sum_{p=1}^{R+P}\sum_{i=1}^{N+M+B}\left(PP_i^p \cdot \sum_{t=1}^{T} R_{it}^p\right) + \\ \sum_{p=R+1}^{R+P}\sum_{t=1}^{T} PO^p \cdot CO_t^p \end{array} \right\} =$$

$$GV_5 + d_5^+ - d_5^-$$

$d_5^+$: positive estrangement from the target value $d_5^-$: negative estrangement from the target value <Restriction condition 13: Profit>

<Restriction Condition 13: Profit>

Assuming that the profit target is GV6, the following is established:

(Eq. 20): Restriction Condition 13

$$\sum_{s}\sum_{i=1}^{N}\sum_{t=1}^{T} PR_i^s \cdot x_{it}^s - \sum_{i=1}^{N}\sum_{p\in P} PM_i^p \cdot I_{i0}^p -$$

$$\sum_{p=1}^{R+P}\sum_{p'=R+1}^{R+P+S}\sum_{i=1}^{N+M+B}\left\{ \begin{array}{c} \sum_{e=1}^{E}\sum_{t=1}^{T} Q_{ie}^{pp'} \cdot U_{iet}^{pp'} + \\ \sum_{p=1}^{R+P}\sum_{i=1}^{N+M}\left(PP_i^p \cdot \sum_{t=1}^{T} R_{it}^p\right) + \\ \sum_{p=R+1}^{R+P}\sum_{i=1}^{N+M} PC^p \cdot CO_t^p \end{array} \right\} -$$

$$FC + \sum_{p}\sum_{i}\{PM_i^p \cdot I_{iT}^p\} = GV_6 + d_6^+ - d_6^-$$

$d_6^+$: positive estrangement from the target value $d_6^-$: negative estrangement from the target value Where the profit is, different from the cash which the production activity produces, the subtraction of the cost invested onto the products and the fixed cost from the sales, i.e., the cash which the products produces.

<Restriction Condition 14: Cost>

Assuming that the target cost is GV7, the following equation is established:

(Eq. 21): Restriction Condition 14

$$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p$$

$d_7^+$: positive estrangement from the target value $d_7^-$: negative estrangement from the target value $d_7^+$: positive estrangement from the target value
$d_7^-$: negative estrangement from the target value Where the cost corresponds to the cash which is invested during the $1^{st}$ to $T^{th}$ terms, in the numerator of the efficiency of producing the cash, however it does not includes the fixed cost therein.

<Restriction Condition 15: Inventory>

Assuming that the inventory target is GV8, the following equation is established:

(Eq. 22): Restriction Condition 15

$$\frac{1}{T}\left\{ \begin{array}{c} \sum_{j=1}^{B}\left\{\left(\frac{1}{R_j}\sum_{r\in R_j} PP_j^r\right)\cdot\left\{\sum_{r\in R}\sum_{t=1}^{T} R_{jt}^r + \sum_{r\in R}\left\{I_{j0}^p + \sum_{t=1}^{T}\sum_{r=R+1}^{R+P} W_{jt}^{ro}\right\}\right\}\right\} + \\ \sum_{i=1}^{N+M}\sum_{p\in P}\left\{PP_i^p + \sum_{j=N+1}^{N+M+B}\left(BM_{ij} \cdot \frac{1}{P_b}\sum_{p'\in P_b} PM_j^{p'}\right)\right\} \cdot \\ \left\{\sum_{t=1}^{T}\{I_{it}^p + R_{it}^p \cdot LT_i^p\}\right\} + \sum_{i=1}^{N+M+B}\sum_{\substack{p\in R+P \\ p'\in P+S}}\{\{Q_{ie}^{pp'} | i \in n\} + PM_i^p\} \cdot \\ \sum_{t=1}^{T}\{U_{iet}^{pp'} \cdot LT_{ie}^{pp'}\} \end{array} \right\} =$$

$$GV_8 + d_8^+ + d_8^-$$

$d_8^+$: positive estrangement from the target value $d_8^-$: negative estrangement from the target value $d_8^+$: positive estrangement from the target value
$d_8^-$: negative estrangement from the target value Where the inventory corresponds to the denominator of the efficiency of producing the cash.

The restriction conditions 8 to 15 of the above-mentioned management indices are taken into the linear programming problem only when management targets are set.

According to the present invention, when setting the target, with respect to the concrete target value, it is selected whether an actual numerical value is desired to be equal to greater or less than that, or coincident with that. Alternatively, it may be not such the target value, but may be set as "maximum" or "minimum". Hereinafter, those choices are called by a name of flag. In addition to the flag, weight is given on the management index or indices, which are considered to be important.

Assuming that all the management targets are set, then the objective function comes to be as follows:

(Eq. 23): Objective Functions $$\min F_1^- \cdot \sum_{s=1}^{S}\sum_{i=1}^{N}\sum_{t=1}^{T} Z_1 \cdot PR_i^s \cdot d_{1,s,i,t}^- + F_1^+ \cdot \sum_{s=1}^{S}\sum_{i=1}^{N}\sum_{t=1}^{T} Z_{1,s,i} \cdot PR_i^s \cdot d_{1,s,i,t}^+ +$$

$$F_2^- \cdot \sum_{p=1}^{P} Z_{2,p} \cdot d_{2,p}^- + F_2^+ \cdot \sum_{p=1}^{P} Z_{,p2} \cdot d_{2,p}^+ + F_3^- \cdot Z_3 \cdot d_3^- + F_2^+ \cdot Z_3 \cdot d_3^+ +$$

$$F_4^- \cdot Z_{4,s} \cdot d_{4,s}^- + F_4^+ \cdot Z_{4,s} \cdot d_{4,s}^+ + F_5^- \cdot Z_5 \cdot d_{5,p}^- + F_5^+ \cdot Z_5 \cdot d_{5,p}^+ + F_6^- \cdot Z_6 \cdot d_6^- +$$

$$F_6^+ \cdot Z_6 \cdot d_6^+ + F_7^- \cdot Z_7 \cdot d_7^- + F_7^+ \cdot Z_7 \cdot d_7^+ + F_8^- \cdot Z_8 \cdot d_8^- + F_8^+ \cdot Z_8 \cdot d_8^+$$

Where F. is the flag, and regarding F+, it is:
equal or greater than the target value: −1
equal or less than the target value: 1
coincident with: 1
maximum: −A (A: for some positive number)
minimum: A,
and regarding F−, it is:
equal or greater than the target value: 1
equal or less than the target value: −1
coincident with: 1
maximum: A (A: for some positive number)
minimum: −A.

Also, Z. indicates the weighting on each of the management indices.

Figure 3:
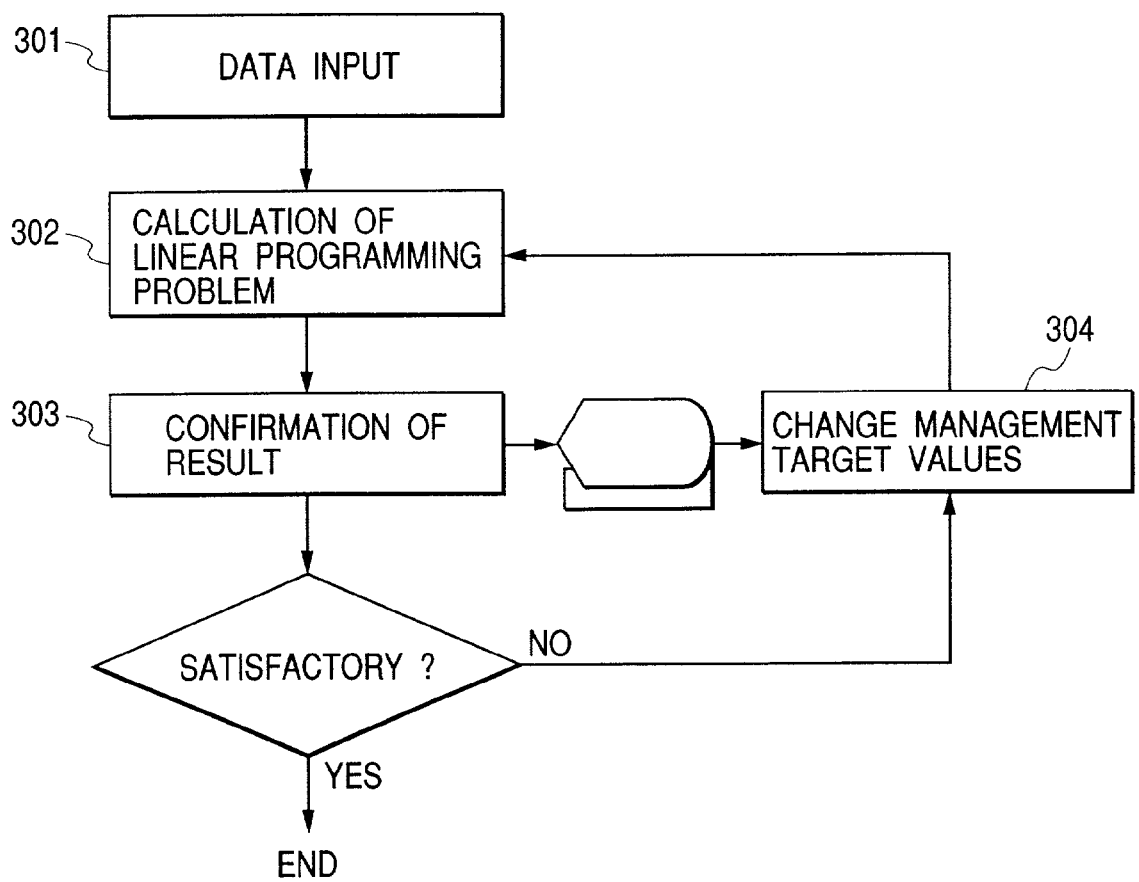
FIG. 3 is a view of showing flows of processes until planning of the production plan.

Next, according to the modeling indicated by those equations, Eqs. 1 to 23, the flows up to planning of the production plan will be shown in FIG. 3.

In a step 301 are inputted the data of the constants corresponding to the Eq. 2 and the target values of the management indices. The data relating to the target values of the management index are made of the "management index", a "mark for determining whether being set or not", the "flag", and the "target value".

In a step 302, non-negative conditions of the Eq. 3 and the linear programming equations indicated in the Eqs. 4 to 22 are solved. Each item of the restriction conditions 8 to 15 relating to the management indices and the objective functions is selected to be relevant with the "being set" management index, by referring to the "mark for determining whether being set or not" thereof, so as to be added to the linear programming problems. Also, with respect to the restriction conditions 1 to 7, the restriction condition 3 may deleted if it is desired to delete the restriction upon the production capacity, while the restriction condition 7 may be deleted if it is desired to delete the restriction upon the transportation capacity.

As a means for solving the linear programming problems may be applied a linear programming software package, or a simplex method, or an interior point method, etc.

In a step 303, optimal solutions obtained in 302 are converted to the production plan, and are displayed on a display means, such as a CRT, etc. According to the present invention, the following variables form the production plan:

(Eq. 24) Production Plan $R_{it}^P$: amount of the part i to be newly supplied from the supply point p in the $t^{th}$ term (material supply plan)

however, (i=N+M+1, ..., N+M+B), (t=1, 2, ..., T) (p=1, 2, ..., R);

$R_{it}^P$: amount of the semi-product or the product i produced at the production point p in the $t^{th}$ term (products/semi-products production plan)

however, (i=1, ..., N+M), (t=1, 2, ..., T) (p=R+1, ..., R+P);

$x_{it}^s$: amount of product i to be delivered to the marketing point s in the $t^{th}$ term (sales plan)

(s=(p=) R+P+1, R+P+2, ..., R+P+S) (i=1, 2, ..., N) (t=1, 2, ..., T);

$U_{iet}^{pp'}$: amount of the part i to be transported from the conditions relating to the target values of the management indices are accumulated in a memory means (not shown in the figure). Also, the information relating to the transport of the parts and/or the products among the plural production points, supply points, and marketing points, and also the information relating to the costs at the plural points, etc., can be held in the memory means (not shown in the figure). Also, under the restriction condition mentioned above, calculation for obtaining the solution which achieve the target value of at least one of the management indices is executed by a calculation process means (not shown in the figure).

Also, the embodiment according to the present invention, wherein the transport information among the plural points and/or the information relating to the cost, etc., at each of the points are transmitted from the user's terminal side via a network, while the solutions achieving the target values of management indices are calculated out through the calculation process in a production plan system which is accumulated at a host server side, thereby transmitting the processed results to the user's terminals, or also other embodiment, wherein the information of the target values of management indices is transmitted from the user's terminal side via the network, while the solutions achieving the target values of management indices are calculated out through the calculation process in the production plan system accumulated process p to p' by means e in the $t^{th}$ term (transportation plan)

(I=N+1, N+2, ..., N+M+B), (t=1, 2, ..., T), (p=1, 2, ..., R+P+S); and $CO_t^p$: the over time at the process p in the $t^{th}$ term (capacity plan)

Also, from the optimal solutions obtained in 302, "actual values" of all the management indices are calculated to be displayed on the display means, such as the CRT, etc. The "actual values" of all the management indices are calculated by the following equations:

(Eq. 25) Equation for calculating out the management indices: the fulfillment of demands from the marketing points $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{ii}^p\right) + \sum_{p=R+1}^{R+P}\sum_{t=1}^{T} PO^p \cdot CO_t^p = GV_7 + d_7^+ + d_7^-$$

$d_7^+$: positive estrangement from the target value $d_7^-$: nagative estrangement from the target value (i=1, ..., N, s=R+P+1, ..., R+P+S, t=1, ..., T)

(Eq. 26) Equation for calculating out the management indices: the rate of operation $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (p=R+1, ..., R+P)

(Eq. 27) Equation for calculating out the management indices: the efficiency of producing the cash by the production activity $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (Eq. 28) Equation for Calculating Out the Management Indices: the Sales $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (s = R + P + 1, ... , R + P + S)

(Eq. 29) Equation for Calculating Out the Management Indices: the Cash which the Production Activity Produces $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (Eq. 30) Equation for Calculating Out the Management Indices: the Profit $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (Eq. 31) Equation for Calculating Out the Management Indices: the Cost $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value (Eq. 32) Equation for Calculating Out the Management Indices: the Inventory $$\sum_{p=1}^{R+P}\sum_{p'=R+1}^{R+P+S}\sum_{i=1}^{N+M+B}\sum_{e=1}^{E}\sum_{t=1}^{T} Q_{ie}^{pp'} \cdot U_{iet}^{pp'} +$$

$$\sum_{p=1}^{R+P}\sum_{i=1}^{N+M+B}\left(PP_i^p \cdot \sum_{t=1}^{T} R_{it}^p\right) + \sum_{p=R+1}^{R+P}\sum_{t=1}^{T} PO^p \cdot CO_t^p = GV_7 + d_7^+ + d_7^-$$

$d_7^+$ : positive estrangement from the target value $d_7^-$ : negative estrangement from the target value It does not matter that the production plan and/or the management indices is/are displayed in the form of a table (or chart) or a graph.

The person in charge of the production plan confirms the production plan and the management indices from the display means, such as the CRT, so as to decide to be satisfied with that production plan or not. If it is not good, in a step 304, the target values of the management indices are changed though an input means, such as a keyboard, and the flow is turned back to the processes after the step 302.

In this manner, though the steps 302 to 304 are executed repetitively until the satisfactory production plan is calculated out, by displaying the production plan and the management indices in the step 303, it is possible to estimate the merits of the production plan in view of the management indices, and further, even in a case there are the management indices being in a trade-off relationship between them, by setting the lowest values to be satisfied, being desirous for the person in charge of that production plan, as the respective target values of the management indices, the solution is obtained by taking those target values into the consideration, therefore it is possible to obtain the satisfactory production plan soon.

Regarding the steps 301 to 304 mentioned above, the processes will be explained in more details thereof, with referring to an example of the production plan of the product "PC".

Figure 4:
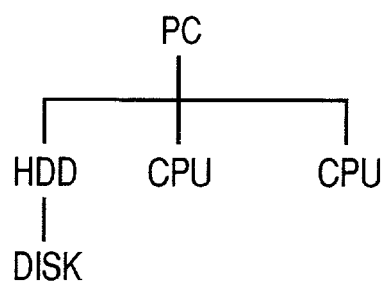
FIG. 4 is a view of showing the bill of materials, in an example of the planning of the production plan.
Figure 5:
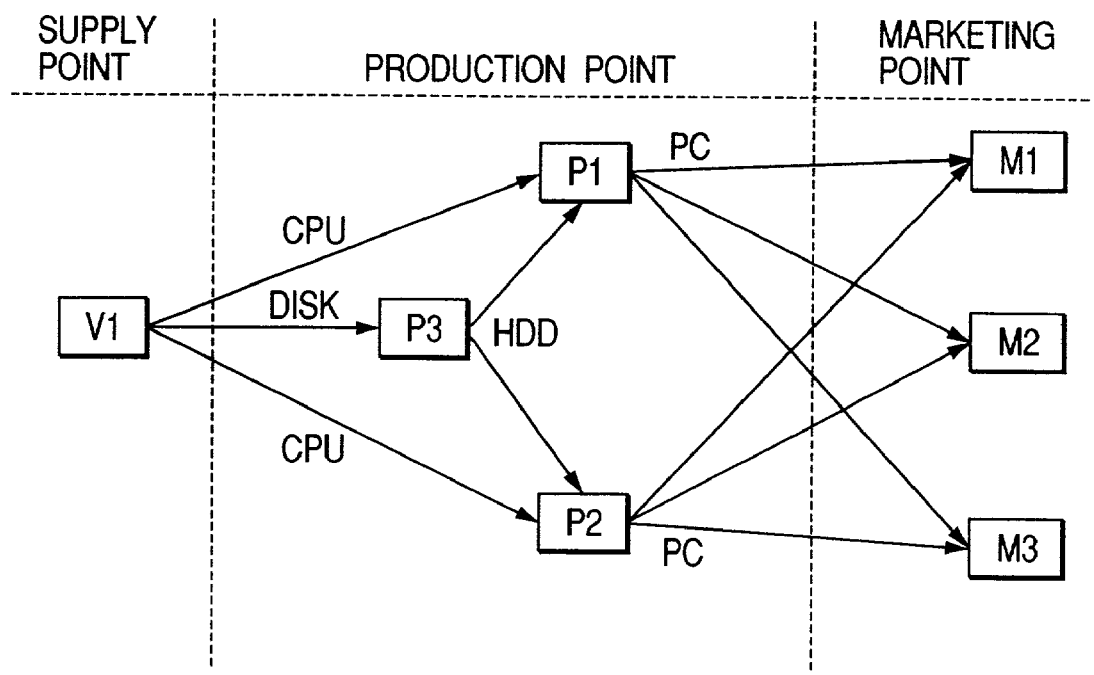
FIG. 5 is a view of showing flows of supply-production-sales, in the example of the planning of the production plan.

In FIG. 4 are shown the bill of materials of the "PC". One (1) unit of the product "PC" is produced by using one (1) unit of an semi-product "HDD" and two (2) units of parts "CPUs". Also, the one (1) unit of semi-product "HDD" is produced by using one (1) unit of a part "DISK". With the points, as shown in FIG. 5, the marketing points of PC are three (3), M1, M2, and M3, the production points of PC are two (2), P1 and P2, the production point of HDD is one (1), P3, and a supply point of CPU and DISK is one (1), V1. In FIG. 6 is shown a transportable route and/or a transport lead time/cost per a transport means between the points. The transport route and the transport means from the supply point to the production point and between the production points are only one way each, however there are two (2) means as the transport means from the production points P1 and P2 to the marketing points M1, M2 and M3 at the maximum. One of them is transport via an airplane, and the other is that via a ship, and the transport of the airplane is shorter than that of the ship in the lead-time, however is high in the transport cost. There is no specific restriction upon the capacity of transportation. Also, the fixed cost at the points as a whole is ten (10).

Under such the basis, assuming the case where the expectation amount of sales of PC from each marketing point is 100 in the $10^{th}$ term during the planning terms from the $1^{st}$ term to $10^{th}$ term, the production plan for each of the production points is planned. The selling price of the PC is assumed to be 45 at M1, 30 at M2, and 35 at M3, respectively. It is assumed that the operable time in each of the production points M1 and M2 is 70 for every term, the operable time of M3 is 300 for every term, and no over time is possible in each of the points. The operation times, the lead times, and the costs of the PC and the HDD, at each of the points, are as shown in FIG. 7. Also, the operation time, the lead time, the unit price and the standard cost at the supply point V1 of the CPU and DISK are as shown in FIG. 8. The inventory at the end of the $0^{th}$ term and the released order and/or work in process in a warehouse are assumed to be zero (0). Since there is only one way in the flow of goods from the parts to the semi-products, points in determination of intention in this example are the production points of the PC, the transportation route from the production points to the marketing points, and the transportation means.

First, upon the basis of the concrete example described above, the restriction conditions 1 to 6 are formulated as below. However, the restriction condition 7 is not necessary since there is no limitation in the transportation capacity.

<Restriction Condition 1>
(Eq. 33) Restriction Condition 1 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_t^p = GV_7 + d_7^+ + d_7^-$$

$d_7^+$ : positive estrangement from the target value $d_7^-$ : negative estrangement from the target value $(t = 1, 2, \ldots, T)$ <Restriction Condition 2>
(Eq. 34) Restriction Condition 2 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_t^p = GV_7 + d_7^+ + d_7^-$$

$d_7^+$ : positive estrangement from the target value $d_7^-$ : negative estrangement from the target value $(t = 1, 2, \ldots, T)$ <Restriction Condition 3>
(Eq. 35) Restriction Condition 3 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_t^p = GV_7 + d_7^+ + d_7^-$$

$d_7^+$ : positive estrangement from the target value $d_7^-$ : negative estrangement from the target value $(t = 1, 2, \ldots, T)$ <Restriction Condition 4>
(Eq. 36) Restriction Condition 4 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_t^p = GV_7 + d_7^+ + d_7^-$$

$d_7^+$ : positive estrangement from the target value $d_7^-$ : negative estrangement from the target value <Restriction Condition 5>
(Eq. 37) Restriction Condition 5 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_t^p = GV_7 + d_7^+ + d_7^-$$

$d_7^+$ : positive estrangement from the target value $d_7^-$ : negative estrangement from the target value $(t = 1, 2, \ldots, T)$ <Restriction Condition 6>
(Eq. 38) Restriction Condition 6 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value The restriction conditions 8 to 15 relating to the target values of the management indices are formulated as follows:

<Restriction Condition 8>
(Eq. 39) Restriction Condition 8 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 9>
(Eq. 40) Restriction Condition 9 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 10>
(Eq. 41) Restriction Condition 10 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 11>
(Eq. 42) Restriction Condition 11 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 12>
(Eq. 43) Restriction Condition 12 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^+$: negative estrangement from the target value <Restriction Condition 13>
(Eq. 44) Restriction Condition 13 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 14>
(Eq. 45) Restriction Condition 14 in the Exercise $$\sum_{p=1}^{R+P} \sum_{p'=R+1}^{R+P+S} \sum_{i=1}^{N+M+B} \sum_{e=1}^{E} \sum_{t=1}^{T} Q_{ie}^{pp'} \cdot U_{iet}^{pp'} +$$

$$\sum_{p=1}^{R+P} \sum_{i=1}^{N+M+B} \left( PP_i^p \cdot \sum_{t=1}^{T} R_{it}^p \right) + \sum_{p=R+1}^{R+P} \sum_{t=1}^{T} PO^p \cdot CO_i^p = GV_7 + d_7^+ + d_7^-$$

$d_7^+$: positive estrangement from the target value $d_7^-$: negative estrangement from the target value <Restriction Condition 15>
(Eq. 46) Restriction Condition 15 in the Exercise $$\sum_{p=1}^{R+P}\sum_{p'=R+1}^{R+P+S}\sum_{i=1}^{N+M+B}\sum_{e=1}^{E}\sum_{t=1}^{T}Q_{ie}^{pp'}\cdot U_{iet}^{pp'}+$$

$$\sum_{p=1}^{R+P}\sum_{i=1}^{N+M+B}\left(PP_{i}^{p}\cdot\sum_{t=1}^{T}R_{it}^{p}\right)+\sum_{p=R+1}^{R+P}\sum_{t=1}^{T}PO^{p}\cdot CO_{i}^{p}=GV_{7}+d_{7}^{+}+d_{7}^{-}$$

$d_7^+$: positive estrangement from the target value $d_7^-$: negative estrangement from the target value The objective function is as follows:
(Eq. 47) Objective Function in the Exercise $$\min F_1^{-}\cdot\sum_{s=1}^{S}\sum_{i=1}^{N}\sum_{t=1}^{T}Z_1\cdot PR_i^s\cdot d_{1,s,i,t}^{-}+F_1^{+}\cdot\sum_{s=1}^{S}\sum_{i=1}^{N}\sum_{t=1}^{T}Z_{1,s,i}\cdot PR_i^s\cdot d_{1,s,i,t}^{+}+$$

$$F_2^{-}\cdot\sum_{p=1}^{P}Z_{2,p}\cdot d_{2,p}^{-}+F_2^{+}\cdot\sum_{p=1}^{P}Z_{,p2}\cdot d_{2,p}^{+}+F_3^{-}\cdot Z_3\cdot d_3^{-}+F_2^{+}\cdot Z_3\cdot d_3^{+}+$$

$$F_4^{-}\cdot Z_{4,s}\cdot d_{4,s}^{-}+F_4^{+}\cdot Z_{4,s}\cdot d_{4,s}+F_5^{-}\cdot Z_5\cdot d_{5,p}^{-}+F_5^{+}\cdot Z_5\cdot d_{5,p}^{+}+F_6^{-}\cdot Z_6\cdot d_6^{-}+$$

$$F_6^{+}\cdot Z_6\cdot d_6^{+}+F_7^{-}\cdot Z_7\cdot d_7^{-}+F_7^{+}\cdot Z_7\cdot d_7^{+}+F_8^{-}\cdot Z_8\cdot d_8^{-}+F_8^{+}\cdot Z_8\cdot d_8^{+}$$

As a first example (exercise 1) of the panning of a production plan, the production plan is planned only by the management index, i.e., the fulfillment of demands from the marketing points is 100%. The restriction condition is, in addition to those 1 to 6, GV1=1, for example, in the restriction condition 8. Those from 9 to 15 are not used. The objective functions are as follows:
(Eq. 48) Objective Function in the Exercise 1

$$\min F_1^{-}\cdot\sum_{s=1}^{S}\sum_{i=1}^{N}\sum_{t=1}^{T}Z_1\cdot PR_i^s\cdot d_{1,s,i,t}^{-}+F_1^{+}\cdot\sum_{s=1}^{S}\sum_{i=1}^{N}\sum_{t=1}^{T}Z_{1,s,i}\cdot PR_i^s\cdot d_{1,s,i,t}^{+}+$$

$$F_2^{-}\cdot\sum_{p=1}^{P}Z_{2,p}\cdot d_{2,p}^{-}+F_2^{+}\cdot\sum_{p=1}^{P}Z_{,p2}\cdot d_{2,p}^{+}+F_3^{-}\cdot Z_3\cdot d_3^{-}+F_2^{+}\cdot Z_3\cdot d_3^{+}+$$

$$F_4^{-}\cdot Z_{4,s}\cdot d_{4,s}^{-}+F_4^{+}\cdot Z_{4,s}\cdot d_{4,s}+F_5^{-}\cdot Z_5\cdot d_{5,p}^{-}+F_5^{+}\cdot Z_5\cdot d_{5,p}^{+}+F_6^{-}\cdot Z_6\cdot d_6^{-}+$$

$$F_6^{+}\cdot Z_6\cdot d_6^{+}+F_7^{-}\cdot Z_7\cdot d_7^{-}+F_7^{+}\cdot Z_7\cdot d_7^{+}+F_8^{-}\cdot Z_8\cdot d_8^{-}+F_8^{+}\cdot Z_8\cdot d_8^{+}$$

When solving this problem, the solution is obtained as shown in FIG. 9, for example, and it satisfies 100% of the fulfillment rate of demands from the marketing points. In this manner, it is possible to plan the production plan only with the restriction conditions and one management index. However, since no consideration is made upon the management index other than the fulfillment rate of demands, for example, the route of transporting from P1 to M2 by the airplane has the transportation amount of 60, in spite the fact that the cost is 31 (parts cost+production cost+transportation cost) for the sales 30. For references, the profit produced by this production plan is 2,900, and the inventory is 1,666.

As a second example (exercise 2) of the panning of a production plan, there is listed up a method of planning and/or modifying the production plan, while watching the values of eight management indices, according to the steps shown in the FIG. 3.

<Step 301 (1$^{st}$ Time)>

The management indices are as below:

the fulfillment rate of demands is 100%, and the profit is the maximum.

Herein, the planning and modification of the production plan are obtained by taking the management index of "the profit is the maximum" into the consideration, in addition to the management index of "the fulfillment rate of demands is 100%" indicated in the exercise 1.

<Step 302 (1$^{st}$ Time)>

The restriction conditions are, in addition to those 1 to 6, GV1=1 in the restriction condition 8, and GV6=1 in the restriction condition 13. The objective function is as follows, for example:

(Eq. 49) Objective function in the exercise 2, 1$^{st}$ time $$\min F_1^{-}\cdot\sum_{s=1}^{S}\sum_{i=1}^{N}\sum_{t=1}^{T}Z_1\cdot PR_i^s\cdot d_{1,s,i,t}^{-}+F_1^{+}\cdot\sum_{s=1}^{S}\sum_{i=1}^{N}\sum_{t=1}^{T}Z_{1,s,i}\cdot PR_i^s\cdot d_{1,s,i,t}^{+}+$$

$$F_2^{-}\cdot\sum_{p=1}^{P}Z_{2,p}\cdot d_{2,p}^{-}+F_2^{+}\cdot\sum_{p=1}^{P}Z_{,p2}\cdot d_{2,p}^{+}+F_3^{-}\cdot Z_3\cdot d_3^{-}+F_2^{+}\cdot Z_3\cdot d_3^{+}+$$

$$F_4^{-}\cdot Z_{4,s}\cdot d_{4,s}^{-}+F_4^{+}\cdot Z_{4,s}\cdot d_{4,s}+F_5^{-}\cdot Z_5\cdot d_{5,p}^{-}+F_5^{+}\cdot Z_5\cdot d_{5,p}^{+}+F_6^{-}\cdot Z_6\cdot d_6^{-}+$$

$$F_6^{+}\cdot Z_6\cdot d_6^{+}+F_7^{-}\cdot Z_7\cdot d_7^{-}+F_7^{+}\cdot Z_7\cdot d_7^{+}+F_8^{-}\cdot Z_8\cdot d_8^{-}+F_8^{+}\cdot Z_8\cdot d_8^{+}$$

When solving this problem, the solution is obtained as shown in FIG. 10, for example. The value of each of the management indices is as shown in FIG. 11. The profit is 3,110, being increased more than that of the prior example 1.

<Step 303 (1$^{st}$ Time)>

Studying the results, for making the profit maximal, the PC is produced at P2 where the production cost is cheap, and is transported by means of the ship which is cheap in the transport cost. Due to the restriction on the operable time of the process of P2, a part of the operation is conducted at P1, however the rate of operation at P1 is low, such as 41%. Also, it is transported via the ship, therefore the inventory is large, such as 1,678.

<Step 304>

Next, while maintaining the fulfillment rate of demands at 100% and the rate of operation at P1 and P2 are at 70%, minimization is tried on the money amount of the inventory. Namely, it is tried to bring the management indices as follows:

the fulfillment rate of demands is 100%, the rate of operation is 70%, and the inventory is minimal.

Herein, upon basis of the result of the first time, the planning and modification are conducted on the production plan, also by taking into the consideration the management indices of "the rate of operation is 70%" and "the inventory is minimal", in addition to that of "the fulfillment rate of demands is 100%".

<Step 302 (2$^{nd}$ Time)>

The restriction conditions are, in addition to those 1 to 6, GV1=1 in the restriction condition 8, GV2=0.7 in the restriction condition 9, and GV8=1,600 in the restriction condition 15. The objective function is as follows, for example:

(Eq. 50) Objective Function in the Exercise 2, $1^{St}$ Time $$\min F_1^- \cdot \sum_{s=1}^{S}\sum_{i=1}^{N}\sum_{t=1}^{T} Z_1 \cdot PR_i^s \cdot d_{1,s,i,t}^- + F_1^+ \cdot \sum_{s=1}^{S}\sum_{i=1}^{N}\sum_{t=1}^{T} Z_{1,s,i} \cdot PR_i^s \cdot d_{1,s,i,t}^+ +$$

$$F_2^- \cdot \sum_{p=1}^{P} Z_{2,p} \cdot d_{2,p}^- + F_2^+ \cdot \sum_{p=1}^{P} Z_{,p2} \cdot d_{2,p}^+ + F_3^- \cdot Z_3 \cdot d_3^- + F_2^+ \cdot Z_3 \cdot d_3^+ +$$

$$F_4^- \cdot Z_{4,s} \cdot d_{4,s}^- + F_4^+ \cdot Z_{4,s} \cdot d_{4,s}^+ + F_5^- \cdot Z_5 \cdot d_{5,p}^- + F_5^+ \cdot Z_5 \cdot d_{5,p}^+ + F_6^- \cdot Z_6 \cdot d_6^- +$$

$$F_6^+ \cdot Z_6 \cdot d_6^+ + F_7^- \cdot Z_7 \cdot d_7^- + F_7^+ \cdot Z_7 \cdot d_7^+ + F_8^- \cdot Z_8 \cdot d_8^- + F_8^+ \cdot Z_8 \cdot d_8^+$$

When solving this problem, the solution is obtained as shown in FIG. 12, for example. The value of each the management indices is as shown in FIG. 13. The profit is reduced down to 2,826, comparing to that of the first time, the inventory is also decreased down to 1,595, and the rate of operation comes to 70%.

<Step 303 ($2^{nd}$ Time)>

Studying the results, for rising up the rate of operation at P1, the production amount at P2 is shifted to P1. Also, for decreasing down the inventory, the transport means is shifted, stopping use of the ship which is long in the transportation lead time, to the airplane. In a case where the uncertainty is high in the demands, it can be the that the second time production plan is a superior plan. The planner of the production plan compares the first and second plans, by weighting danger of conducting the production activity with holding much of inventory, danger of reducing the profit, and balance of the rate of operation, etc., in a balance, so as to find the superiority between them. For example, for avoiding the danger of inventory, the process is finished as it is, or if the first one is better, it may be enough to set the same target value to the first time or a new one in the step 304, and recalculate it in the step 302.

As in the above, by setting the objective values of the plural management indices and repeating the steps 302 to 304 at least one or more times, it is possible to plan the production plan by taking the plural management indices into the consideration.

Figures 14, 15:
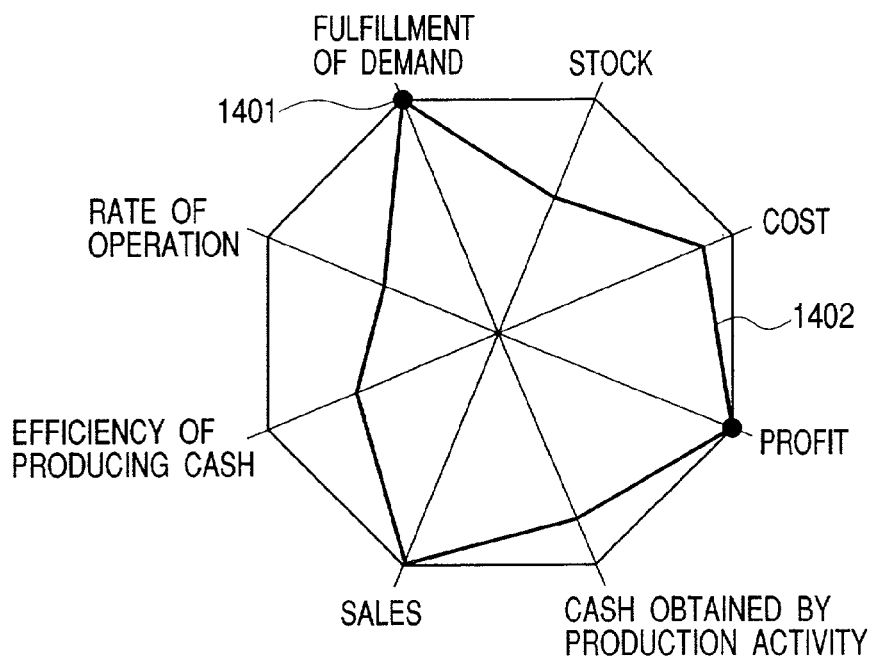
FIG. 14 is a view of showing the management indices of the production plan, in a form of a radar chart, which is planned at the first ($1^{st}$) time in the exercise 2.
FIG. 15 is a view of showing the management indices of the production plan, in a form of a bar graph, which is planned at the first ($1^{st}$) time in the exercise 2.

In the step 303, as an example of the way of displaying the management indices on the display means, such as the CRT, etc., other than the format of the table as shown in FIG. 11, it may be depicted by the radar chart as shown in FIG. 14, or by the rod graph as shown in FIG. 15, thereby displaying the management target values designated in the step 301, such as, by a point 1401 or a line 1501. However, the FIGS. 14 and 15 show the results obtained from the first time of the exercise 2. In the radar chart, it is indicated, the larger the area of a polygon 1402, and in the rod graph, the longer the rod, the better the index. Therefore, with the indices, such as, the inventory, the cost, etc., being the smaller, the better, the display values of coordinates are made larger in reverse proportion with the magnitude of the value. In this manner, indicating the management indices in the graph is a help to understand the difference between the target values and the actual values and the relationship of the trade-off between the management indices.

Figure 16:
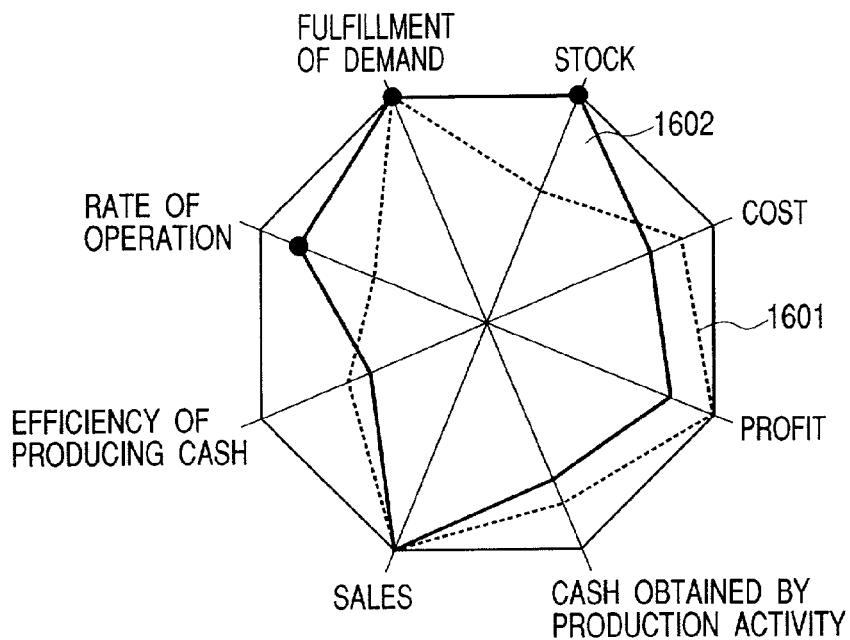
FIG. 16 is a view of showing the management indices of the production plan, in a form of the radar chart, which is planned at the second ($2^{nd}$) time in the exercise 2.
Figure 17:
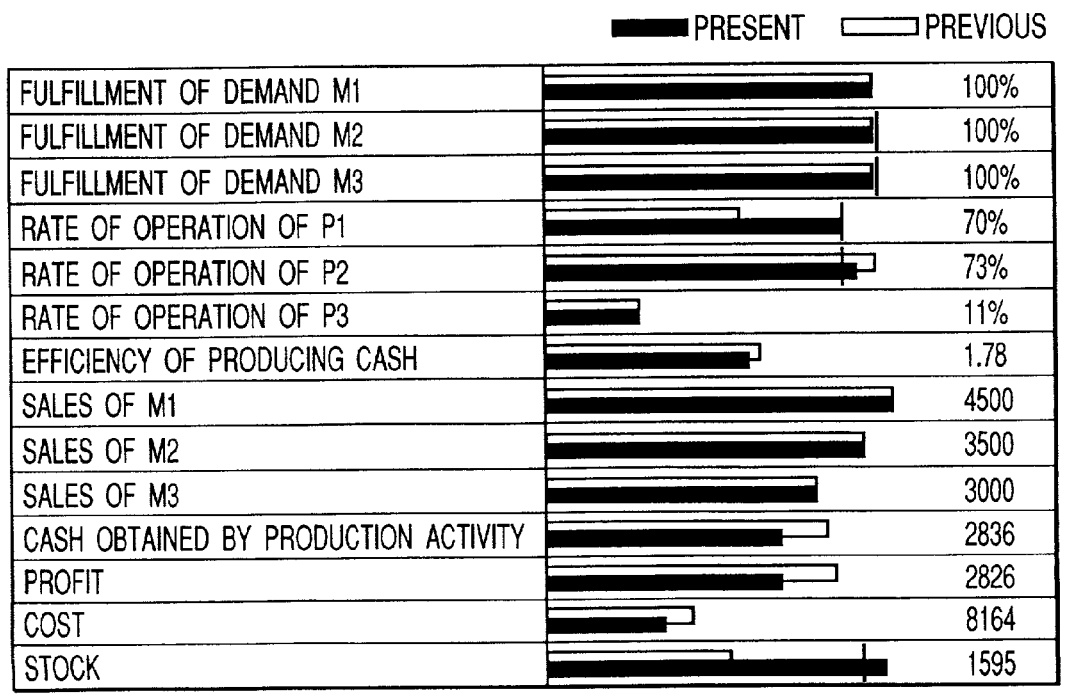
FIG. 17 is a view of showing the management indices of the production plan, in a form of the bar graph, which is planned at the second ($2^{nd}$) time in the exercise 2.

Also, when performing the steps 301 to 303 repetitively, it is easy to grasp the comparison with the previous production plan, if the differences between the previous results are displayed, as shown in FIGS. 16 and 17. Broken line 1601 in the FIG. 16 indicates the result of the first time of the previous exercise 2, while the solid line 1602 that of the second time of the previous exercise 2.

Also, displaying the result values at present or of the past (for example, one day before, one month before, or one year before, etc.) in addition thereto when displaying the radar chart or the graph, it is possible to make them as reference values, in case of changing the management indices in planning of the production plan.

Also, in the embodiment mentioned above, the restriction condition of production capability and the restriction at the host server side, with using transport information among the plural points and/or the information relating to the cost, etc., which are accumulated at the host server side, thereby transmitting the processed results to the user's terminals, falls within a region of the present invention.

According to the embodiment of the present invention, it is possible to calculate out a feasible production plan, which satisfy the target values of plural management indices, quickly, when calculating out the production amount, supply amount and/or transportation means of the plural products at the plural production/material supply/marketing points.

What is claimed is:

1. A system of production planning, operable in response to a request for production planning from a terminal operated by a user, for supporting generating at least one of a plurality of plans including a material procurement plan, a production plan, and a transportation plan each used in a production activity beginning with supply of materials up to transportation to a production point and/or to a marketing point by computer, said system comprising:

memory means that stores various restriction conditions, various management indices and restriction conditional equations relating target values of the management indices to the restriction conditions, each restriction conditional equation being an equation in which an actual value (function)=target value+positive estrangement from the target value (variable)−negative estrangement from the target value (variable), wherein the restriction conditions and the restriction conditional equations relating target values of the management indices to the restriction conditions are derived based on various models including models for storage of parts, semi-products and/or products considered to be in a warehouse, flows of storage into the warehouse and of storage delivery from the warehouse;

input means that accepts, from the user upon production planning, input of various constants, information which selects restriction conditions and at least two or more of the management indices stored in the memory means, target values of the selected at least two or more of the management indices, a weighting coefficient corresponding to each of the selected at least two or more of the management indices and flags for indicating whether the actual value of each restriction conditional equation is optimized to be equal to, greater than, or less than the target value of each of the at least two or more of the management indices which have been input by the user;

calculation process means that reads restriction conditional equations corresponding to the selected at least two or more of the management indices from the memory means, builds the inputted constants and the inputted target values of the selected at least two or more of the management indices into the restriction conditional equations corresponding to the selected at least two or more of the management indices, multiplies each variable that stores a positive estrangement value or a negative estrangement value by the weighting coefficient corresponding to each of the selected at least two or more of the management indices and the flags, composes an objective function for minimizing the sum total of each estrangement value according to the restriction conditional equations corresponding to the selected at least two or more of the management indices read from the memory means, and solves a linear programming problem that optimizes the objective function including calculating each actual value of the selected at least two or more of the management indices according to the restriction conditional equations corresponding to the selected at least two or more of the management indices read from the memory means; and output means that displays each calculated actual value of the selected at least two or more of the management indices, which the calculation process means calculates to solve the linear programming problem, in corresponding relation to the target values which have been inputted by the user, on a display of said terminal in a form of a table, a radar chart or a rod graph, wherein the input means receives input information from the user that are made of management indices to which the user desires change and adjusted target values of the management indices, wherein the calculation process means remakes restriction conditional equations and the objective function according to the input information, repeats solving the linear programming problem, and calculating the actual values of the selected at least two or more of the management indices for which an evaluation of trade-offs is necessary, wherein the input means receives inputs from the user of a judgment that all the calculated actual values of the selected at least two or more of the management indices can be allowed, wherein the calculation process means calculates at least one of a materials procurement plan, a production plan of the products and/or the semi-products, and a transportation plan according to the final optimal solutions of the linear programming problem, and wherein the output means outputs said calculated plans.

2. The system of production planning, as is defined in the claim 1, wherein each of the management indices is a combination of at least one or more of inventory, profit, sales, cost, a rate of operation, fulfilling rate of demands from marketing point, cash which production activity produces, and an efficiency at which the production activity produces cash.

3. The system of production planning, as is defined in the claim 1, wherein the memory means and the calculation process means are set up at a host server, the input means and the output means are set up at the user's terminal connected through the network with the host server.

4. The system of production planning, as is defined in the claim 1, wherein when all calculated actual values of at least three or more of the management indices are displayed in radar chart form, with the management indices being the smaller, the better, the display values of coordinates are made larger in reverse proportion with the magnitude of the value, so that large and small of the quality of the evaluation is made to be shown by the large and small of the area enclosed by the radar chart.

5. The system of production planning, as is defined in the claim 1, wherein the calculated actual values of management indices and past calculated actual values of the management indices are displayed on the output means in a form of a radar chart or a rod graph.

* * * * *